United States Patent
Kostrzewa et al.

(10) Patent No.: US 10,893,001 B2
(45) Date of Patent: Jan. 12, 2021

(54) METHOD FOR COORDINATING ACCESS TO A RESOURCE OF A DISTRIBUTED COMPUTER SYSTEM, COMPUTER SYSTEM AND COMPUTER PROGRAM

(71) Applicant: TECHNISCHE UNIVERSITÄT BRAUNSCHWEIG, Braunschweig (DE)

(72) Inventors: Adam Kostrzewa, Braunschweig (DE); Sebastian Tobuschat, Braunschweig (DE); Rolf Ernst, Braunschweig (DE)

(73) Assignee: TECHNISCHE UNIVERSITAT BRAUNSCHWEIG, Braunschweig (DE)

( * ) Notice: Subject to any disclaimer, the term of this patent is extended or adjusted under 35 U.S.C. 154(b) by 0 days.

(21) Appl. No.: 16/611,109

(22) PCT Filed: Apr. 20, 2018

(86) PCT No.: PCT/EP2018/060203
§ 371 (c)(1),
(2) Date: Nov. 5, 2019

(87) PCT Pub. No.: WO2018/202446
PCT Pub. Date: Nov. 8, 2018

(65) Prior Publication Data
US 2020/0059439 A1    Feb. 20, 2020

(30) Foreign Application Priority Data

May 5, 2017   (DE) .......................... 10 2017 109 703

(51) Int. Cl.
*G06F 13/00* (2006.01)
*H04L 12/911* (2013.01)
(Continued)

(52) U.S. Cl.
CPC ........ *H04L 47/828* (2013.01); *G06F 9/45558* (2013.01); *H04L 47/726* (2013.01); *H04L 47/762* (2013.01); *H04L 47/783* (2013.01)

(58) Field of Classification Search
CPC ........... G06F 9/45558; G06F 15/17325; H04L 47/828; H04L 47/726; H04L 47/762; H04L 47/783
(Continued)

(56) References Cited

U.S. PATENT DOCUMENTS

| | | | |
|---|---|---|---|
| 6,594,279 B1 | 7/2003 | Nguyen et al. | |
| 7,633,958 B2 * | 12/2009 | Chen ................... | H04L 47/15 370/230 |

(Continued)

FOREIGN PATENT DOCUMENTS

DE     10 2009 016 742 B4    3/2011

OTHER PUBLICATIONS

Foster et al: "A Distributed Resource Management Architecture that Supports Adavance Reservations and Co-Allocation", IEEE, 1999 Seventh International Workshop on Quality of Service, pp. 27-36, 1999.

*Primary Examiner* — Kenneth R Coulter
(74) *Attorney, Agent, or Firm* — W&C IP

(57) ABSTRACT

The invention relates to a method for coordinating access to a resource of a distributed computer system, which has a plurality of distributed client stations, wherein there are at least two client stations, each having at least one computer, at least one resource of the computer system, at least one resource manager, which is designed to manage the resources of the computer system assigned thereto, and at least one internal communication medium, via which the at least one computer, the at least one resource and the at least one resource manager are coupled, client-station-internally,
(Continued)

for carrying out data communication, wherein the client stations are coupled to each other via at least one external communication medium in order to carry out data communication. According to the invention, the client stations can communicate among each other. The invention furthermore relates to a computer system of this kind and a computer program for carrying out the method.

15 Claims, 6 Drawing Sheets

(51) Int. Cl.
*G06F 9/455* (2018.01)
*H04L 12/923* (2013.01)

(58) Field of Classification Search
USPC ........ 709/201, 225, 229, 223, 203, 217–219
See application file for complete search history.

(56) References Cited

U.S. PATENT DOCUMENTS

| | | | |
|---|---|---|---|
| 7,680,897 B1* | 3/2010 | Carter | H04L 47/762 709/217 |
| 8,918,761 B1* | 12/2014 | Whitcomb | G06F 9/505 717/120 |
| 9,516,137 B2* | 12/2016 | Fitzpatrick | H04L 69/16 |
| 2007/0156905 A1* | 7/2007 | Chen | H04L 47/808 709/226 |
| 2016/0165005 A1* | 6/2016 | Fitzpatrick | H04L 69/16 709/217 |

\* cited by examiner

METHOD FOR COORDINATING ACCESS TO A RESOURCE OF A DISTRIBUTED COMPUTER SYSTEM, COMPUTER SYSTEM AND COMPUTER PROGRAM

FIELD OF THE INVENTION

The invention relates to a method for coordinating access to a resource of a distributed computer system which has a plurality of distributed subscriber stations. The subscriber stations can communicate with one another. The invention also relates to such a computer system and to a computer program for carrying out the method.

BACKGROUND

Computer systems having a plurality of processors are relatively complex with regard to the management of their resources, for example memories, communication media, input and output channels etc. DE 10 2009 016 742 B4 has already suggested adding a specific resource manager for managing the resources of such a computer system, which resource manager can be used to access resources by means of corresponding reservations with a guaranteed time behavior.

SUMMARY

The present invention relates to a distributed computer system in which a plurality of subscriber stations are arranged in a distributed manner. Examples of such distributed computer systems are networked computer systems, for example multicore ECUs, inside a vehicle or a building, or vehicles which are networked via data connections and the respective local computer systems of which communicate with one another, or any other computer networks, for example the Internet. The first-mentioned example of a vehicle and its internal networked systems may be, for example, an ECU (Electronic Control Unit) with a multicore computer system with an internal bus or network and a resource manager. A plurality of these ECUs are then connected to one another, for example via a network (Ethernet, possibly with its own resource manager). In this case, the term "subscriber station" should be understood in the broadest sense. A subscriber station may be, for example, a local computer or a computer system, for example also a multiprocessor computer system, as is known from the prior art cited at the outset.

Subscriber stations may be, in particular, bus-based computer systems and router-based computer systems and also mixed systems.

In such distributed computer systems, the resource management is even more complex. There has hitherto not been any solution for also enabling an end-to-end communication connection between different subscriber stations with a predictable response behavior. The invention is based on the object of specifying a solution for this.

The object is achieved, as claimed in claim 1, by means of a method for coordinating access to a resource of a distributed computer system which has a plurality of distributed subscriber stations, wherein there are at least two subscriber stations each having at least one computer, at least one resource of the computer system, at least one resource manager configured to manage the resources of the computer system which are assigned to said resource manager, and at least one internal communication medium, via which the at least one computer, the at least one resource and the at least one resource manager are coupled inside the subscriber station for the purpose of communicating data, wherein the subscriber stations are coupled to one another for the purpose of communicating data via at least one external communication medium, wherein resources and/or resource managers of the computer system can be coupled to an external communication medium, having the following method steps:

a) a requester wishing to access a desired resource, which may be a resource beyond the subscriber station of the requester, transmits a connection request having parameters for establishing an end-to-end communication connection between the requester and the desired resource to the resource manager assigned to said requester or to another resource manager of the computer system, b) the resource manager receiving the connection request transmits, at least when the connection request relates, as the desired resource, to an external resource which is not managed by this resource manager, requests to establish the desired end-to-end communication connection to other resource managers of the computer system, c) if the desired end-to-end communication connection to the external resource can be established, the desired resource is reserved by the resource manager managing the desired resource according to the parameters of the connection request and it is signaled to the requester that the desired end-to-end communication connection can be established, d) on the request of the requester, the resource managers involved then cooperatively establish the desired end-to-end communication connection according to the reservation, e) the requester accesses the desired resource via the end-to-end communication connection which has been established.

The invention has the advantage that the desired end-to-end communication connection between the requester and the desired resource can be provided in any case with a predictable performance, in particular with a guaranteed latency and/or a guaranteed minimum data throughput. This is achieved by initiating a negotiation process between the resource managers in advance, that is to say before the actual communication takes place between the requester and the desired resource, via the connection request. If the necessary settings and parameters for providing the desired end-to-end communication connection have been completely negotiated, the actual communication is only then established via the reserved communication connection. This is therefore an at least two-step method or generally speaking a multi-stage method which can be used to ensure the desired predictability of the communication even via a plurality of subscriber stations in a distributed computer system.

The resources or resource managers coupled to an external communication medium can therefore communicate with other subscribers of the computer system, for example with the subscriber stations, via the external communication medium. Accordingly, other subscribers, for example the subscriber stations, can also access such resources and/or resource managers which are coupled to the external communication medium via the external communication medium. A resource manager coupled to an external communication medium may be configured, for example, to manage the resources which are likewise coupled to the external communication medium.

If a requester wishes to access a desired resource, this may be a resource of the requester's own subscriber station or beyond the requester's own subscriber station, for example a resource of another subscriber station or a resource connected to an external communication medium.

The resources can therefore be resources shared by a plurality of subscriber stations or their computers. In this context, resources are understood as meaning, for example, hardware components of the computer system such as the main memory, communication media, input and output channels, cache memories and other hardware and software components which are used, including hardware components which may be on the same chip as the computers. In this context, a computer is understood as meaning any unit which can process a program, for example a microprocessor, a microcontroller or an FPGA.

The overall system therefore contains at least two resource managers which cooperatively control the end-to-end access operations according to the connection request or a reservation request in order to provide time guarantees or to increase the performance, fail-operational, safety or security, or to enable reconfigurability or dynamic runtime adjustment.

The connection request may also be transmitted by the requester to a plurality of resource managers, or a plurality of resource managers can receive the connection request.

A connection request (reservation request) can also describe a cancelation or change of at least one part of the running configuration of the computer system.

Communication between the negotiating resource managers can be carried out by directly or hierarchically interchanging messages. A resource manager can inform the respective other resource managers involved in the negotiation process as soon as resources are released again.

The internal communication medium and the external communication medium may be identical or different communication media. The same applies to the internal communication media of different subscriber stations which may likewise be identical or different. An internal or external communication medium may be, for example, in the form of a data bus, for example in the form of a CAN bus, or in the form of a network router. The communication medium may also be in the form of another network, for example Ethernet. The network router may be in the form of a network-on-chip, in particular. A communication medium may also consist of a multiplicity of network routers in this case.

An external communication medium may have a simple structure and may have only one of the communication media mentioned above, for example a data bus or a network router. An external communication medium may also have a more complex structure, for example as an arrangement comprising such a communication medium and one or more resources coupled thereto and/or one or more resource managers coupled thereto.

The reservation for carrying out the end-to-end communication connection may be a reservation for exclusive access to the desired resource or for non-exclusive access which comprises the possibility of accessing the resource in a parallel manner. It goes without saying that this applies only in cases in which the resource can then also comply with the desired requirements or at least provides quality-of-service mechanisms for this purpose.

One advantageous development of the invention provides for the resource manager receiving the connection request to first of all check whether the desired resource is managed by this resource manager itself and, if this is the case, this resource manager does not transmit any requests to establish the desired end-to-end communication connection to other resource managers. This minimizes the communication effort and the time required for negotiating the desired connection. In such a case, internal resource management is carried out by the local resource manager if a resource inside the subscriber station is accessed.

One advantageous development of the invention provides for a requester to be a computer of the computer system, an application, a monitor, a hypervisor and/or a client. A requester may therefore be formed by hardware components, software components or a combination thereof. In this context, a monitor is understood as meaning an element of the computer system which is configured to monitor hardware components and/or software components of the computer system. Malfunctions in the computer system, for example, can be detected via the monitor. In this case, a resource manager can use monitoring information, that is to say data from the monitor, for optimization, changeover and/or failure safety.

One advantageous development of the invention provides for the parameters of the connection request to comprise at least the type, scope and time behavior (for example the desired latency and/or the minimum data throughput) of the desired resource. In this manner, the connection request for the desired communication connection is adequately defined. In this case, the resource manager can accordingly configure resources which can be adjusted, in particular, with regard to their time behavior, that is to say can set the desired time behavior according to the parameters.

One advantageous development of the invention therefore provides for the resource manager managing the desired resource to set the time behavior of the desired resource and/or further resources and/or communication media needed to access the desired resource according to the parameters of the connection request.

If the desired end-to-end communication connection cannot be established, one advantageous development of the invention provides for the computer system to check alternative configurations of the subscriber stations and/or of external communication media and, if an alternative configuration is suitable for complying with the connection request, to accordingly reconfigure the respective subscriber station and/or the respective external communication medium. In this manner, the probability of establishing the desired communication connection is increased further. One, a plurality of or all components of the computer system can participate in this process of checking alternative configurations and the corresponding reconfiguration, for example the resource manager which receives the connection request from the requester. A plurality of resource managers or the requester and/or a superordinate entity of the computer system may also be involved in this.

One advantageous development of the invention provides for the requester to be part of a different subscriber station of the computer system than the desired resource. This makes it possible to provide resource access across the subscriber stations with a predictable performance.

One advantageous development of the invention provides for the resource managers involved in establishing the desired end-to-end communication connection to ensure and/or control compliance with the parameters of the connection request by cooperatively synchronizing access operations. Accordingly, the resource managers are involved in the desired communication until its completion.

One advantageous development of the invention provides for the resource manager receiving the connection request or another resource manager which receives a request from a resource manager to assess the connection request or request with regard to its validity, feasibility, performance, security and/or influence on other components of the computer system and, in the event of a negative assessment, a) to refuse the connection request or request, or
b) to modify the parameters of the connection request or request and to assesses them again.

In this manner, impermissible resource access operations and/or resource access operations which disrupt the system can be prevented in advance.

The object mentioned at the outset is also achieved by means of a computer system which has a plurality of distributed subscriber stations, wherein there are at least two subscriber stations each having at least one computer, at least one resource of the computer system, at least one resource manager configured to manage the resources of the computer system which are assigned to said resource manager, and at least one internal communication medium, via which the at least one computer, the at least one resource and the at least one resource manager are coupled inside the subscriber station for the purpose of communicating data, wherein the subscriber stations are coupled to one another for the purpose of communicating data via at least one external communication medium, wherein resources and/or resource managers of the computer system can be coupled to an external communication medium, wherein the computer system is configured to carry out a method as claimed in one of the preceding claims. This also makes it possible to achieve the advantages explained above.

One advantageous development of the invention provides for a communication medium to consist of a multiplicity of network routers, via which communication takes place in a packet-based manner between subscribers coupled thereto, wherein different communication media can use different packet formats. This allows particularly efficient data communication in complex computer systems. The coupled subscribers may be, in particular, subscriber stations, individual resources and/or resource managers.

This may apply both to the internal communication medium of one or more subscriber stations and to the external communication medium. As already mentioned, the various communication media (internal/external) of the computer system may be different. For example, a subscriber station may have a CAN bus as an internal communication medium and can be connected, via Ethernet as an external communication medium, to another subscriber station which has a router in the form of a network-on-chip as an internal communication medium.

One advantageous development of the invention provides for a communication medium to have at least one resource manager configured to manage the resources of the computer system which are assigned to said resource manager or to be coupled to said resource manager, and/or for a plurality of communication media to be allocated to a resource manager for management. It is therefore possible to use a communication medium with an integrated resource manager.

One advantageous development of the invention provides for the resource managers to be different with respect to their complexity and/or functionality. This therefore allows a diverse structure of the different resource managers, for example depending on the complexity and/or functionality of the corresponding subscriber station or of the communication medium.

One advantageous development of the invention provides for a respective resource manager to be implemented in the form of software and/or hardware. This allows great flexibility when implementing the resource managers.

The resource managers may also be different in terms of their implementation. For example, one resource manager of a subscriber station may be implemented in the form of software, another may be implemented in the form of hardware and yet another resource manager may be implemented in the form of a combination of software and hardware.

The object mentioned at the outset is also achieved by means of a computer program having program code means configured to carry out a method of the type explained above when the computer program is executed on a computer or a plurality of computers of the computer system.

DESCRIPTION OF THE DRAWINGS

The invention is explained in more detail below on the basis of exemplary embodiments using drawings, in which.

DETAILED DESCRIPTION

Figure 1:
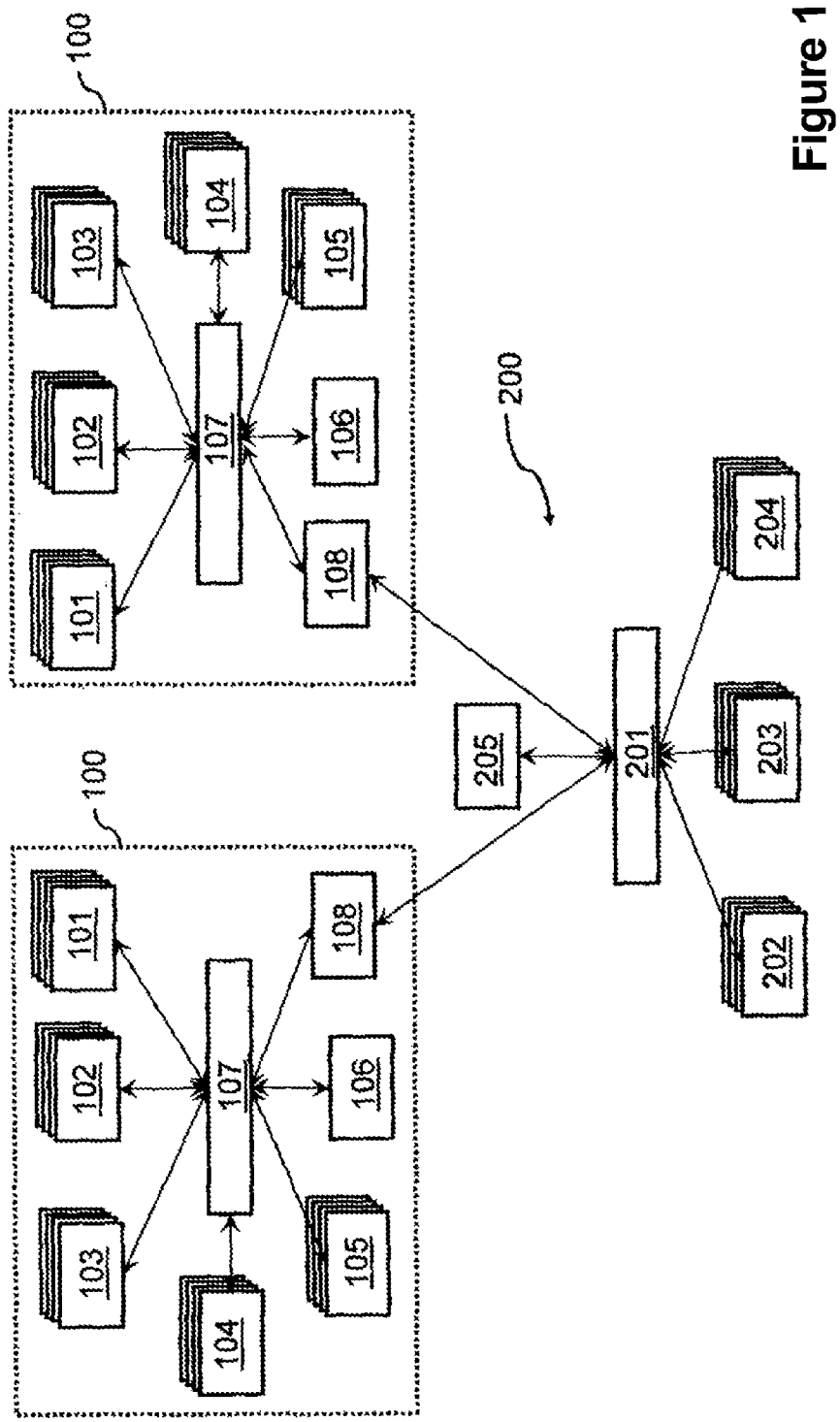
FIG. 1 shows a distributed computer system in a first embodiment.
Figure 2:
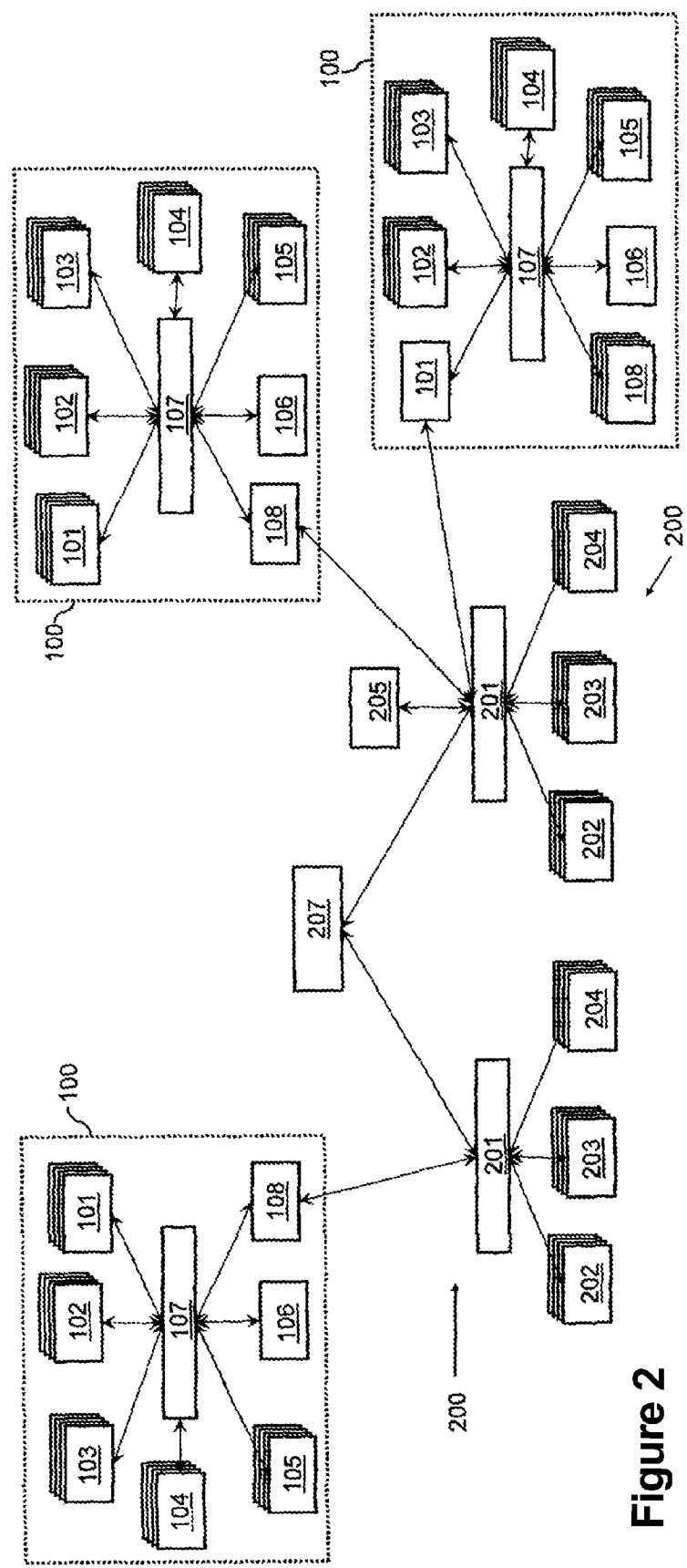
FIG. 2 shows a distributed computer system in a second embodiment.

In the figures, the same reference signs are used for mutually corresponding elements. FIGS. 1 and 2 show the computer system in a highly schematic form. As can be seen, the computer system according to FIG. 2 is substantially more complex than the computer system in FIG. 1.

The computer system illustrated in FIG. 1 has two subscriber stations 100 which may be on-board systems of a vehicle, for example. The subscriber stations 100 are coupled to one another via an external communication medium 200. The subscriber stations 100 have, for example, a computer 103 in the form of a processor and, as resources, shared memory 102, sensors and actuators 101, a main memory controller 104, a hardware accelerator 105. The above-mentioned components 101, 102, 103, 104, 105 may also be present in multiple form. A subscriber station 100 can therefore already be in the form of a multiprocessor system. Furthermore, the computer system illustrated in FIG. 1 has a resource manager 106 and a gateway/interface 108 as an interface to the external communication medium 200 which allows data communication with external components. These components are coupled to one another inside the subscriber station via an internal communication medium 107 in order to interchange data with one another. The internal communication medium 107 may be an on-chip interconnect, for example.

The external communication medium 200 has its own internal communication medium 201 which is coupled to the gateways/interfaces 108 for data communication. The internal communication medium 201 may be in the form of Ethernet or a CAN bus (off-chip), for example. Further resources of the computer system are coupled to the internal communication medium 201, for example hardware accelerators 202, sensors/actuators 203, further gateways/interfaces 204. A separate resource manager 205 which is likewise coupled to the internal communication medium 201 is assigned to the external communication medium 200.

In the example illustrated, the external communication medium 200 is already in the form of a complex communication medium. The invention also comprises embodiments in which the external communication medium 200 is less complex, for example has only the internal communication medium 201 of an Ethernet network, for example. The external communication medium 200 may also comprise more or fewer than the illustrated components coupled to the internal communication medium 201.

Whereas FIG. 1 shows a comparatively clear case of a distributed computer system in which only an off-chip network is present, FIG. 2 shows an extended example in which there are three subscriber stations 100 which can be designed according to the structure of a subscriber station 100 explained above. The subscriber station 100 illustrated on the left is coupled to a first external communication medium 200. The two subscriber stations 100 illustrated on the right are coupled to a second external communication medium 200. The external communication media 200 may have a comparable structure to the external communication medium 200 explained on the basis of FIG. 1, either with a separate resource manager 205 or without such a separate resource manager (external communication medium 200 illustrated on the left in FIG. 2). The external communication media 200 can be coupled to one another for data communication via a further communication medium 207, for example via a gateway. In the exemplary embodiment illustrated, one internal communication medium 201 may be in the form of an off-chip CAN bus, for example, and the other internal communication medium 201 can be in the form of off-chip Ethernet.

Figure 3:
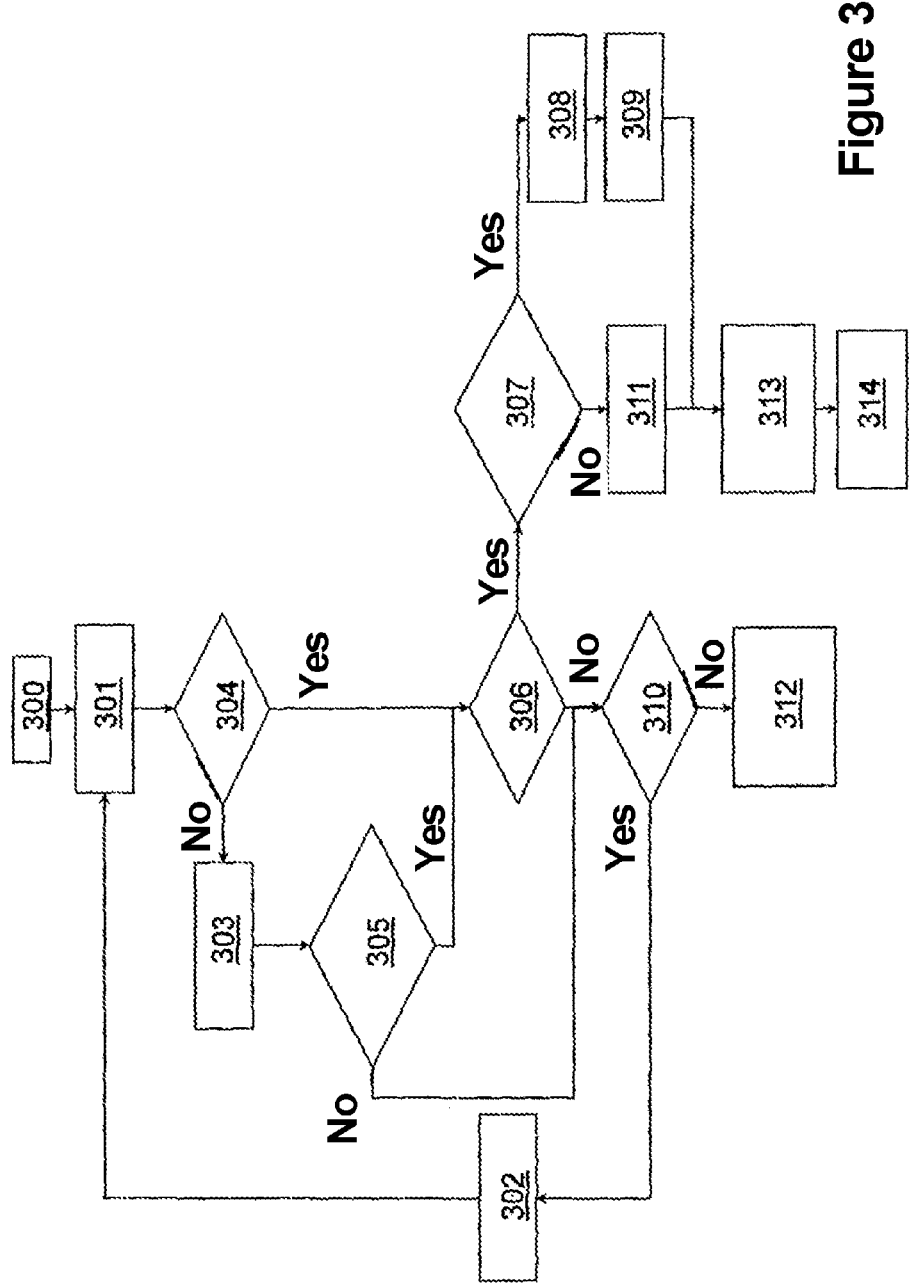
FIG. 3 shows a flowchart of the processing of a connection request in a resource manager.

The method according to the invention for coordinating access to a resource can be carried out in both variants of the computer system described and in any desired further combinations of subscriber stations 100 and external communication media 200. This is initially generally represented in FIG. 3 on the basis of a flowchart. The method begins with a connection request 300 being transmitted from a requester to a resource manager. In step 301, the current configuration is then checked. If it is then determined in step 304 that the resource manager receiving the connection request itself manages the desired resource(s), the method branches directly to a step 306. Otherwise, the method continues with a step 303 in which requests are transmitted to other resource managers which are or may be relevant for providing the desired resource. If it is then determined in a step 305 that the other resource managers receiving the requests are able to provide the desired resource, the method branches to step 306. Otherwise, the method branches from step 305 to step 310.

Step 306 checks whether the desired resource can be provided according to the parameters of the connection request. If this is the case, the method branches to step 307. Otherwise the method branches to step 310 which checks whether the connection request can be complied with using another configuration. If this is the case, the method branches to step 302 in which the system is reconfigured so that the desired resource can be provided according to the connection request. The method then continues with step 301, as explained above. If it is determined in step 310 that there is no suitable configuration for complying with the connection request, the requester is informed in step 312 that the connection request cannot be complied with.

Step 307 checks whether the connection request or the request comes from another resource manager. If this is not the case, the method continues with step 311 in which a confirmation is transmitted to the other resource managers. Otherwise, the method continues from step 307 with step 308 in which the other resource managers are informed that the desired end-to-end communication connection can be established. A step 309 then waits for a confirmation from the other resource managers.

Step 313 then continues with reserving or providing the desired resource(s) and waits until other resource managers have completed the required configuration. In this case, the resource manager which received the connection request from the requester waits for the confirmation from all other resource managers involved before success is signaled to the requester.

In a step 314, the requester is then informed that the desired end-to-end communication connection can be established. The requester can now have this end-to-end communication connection set up and accesses the desired resource via said connection.

Figure 4:
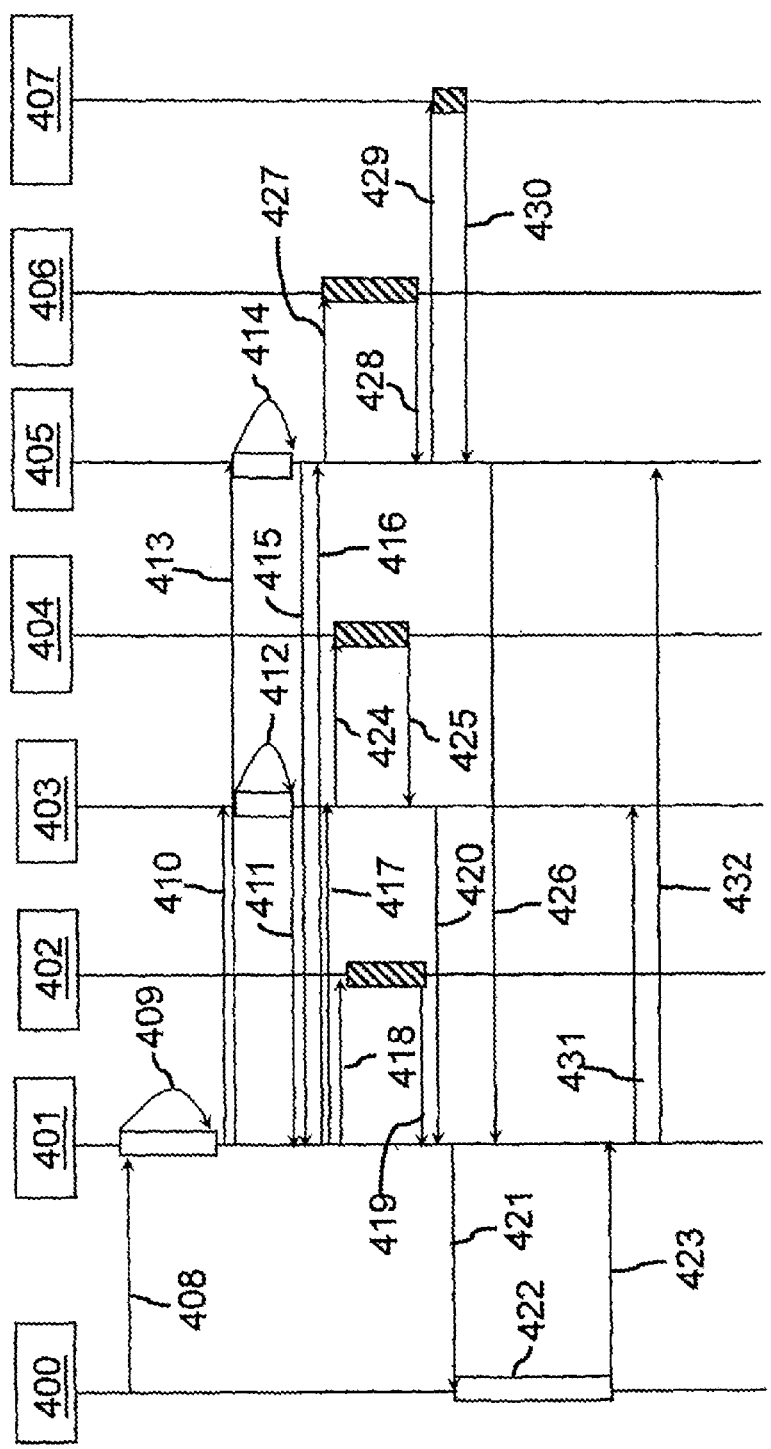
FIGS. 4 to 6 show a complete protocol sequence in different embodiments.
Figure 5:
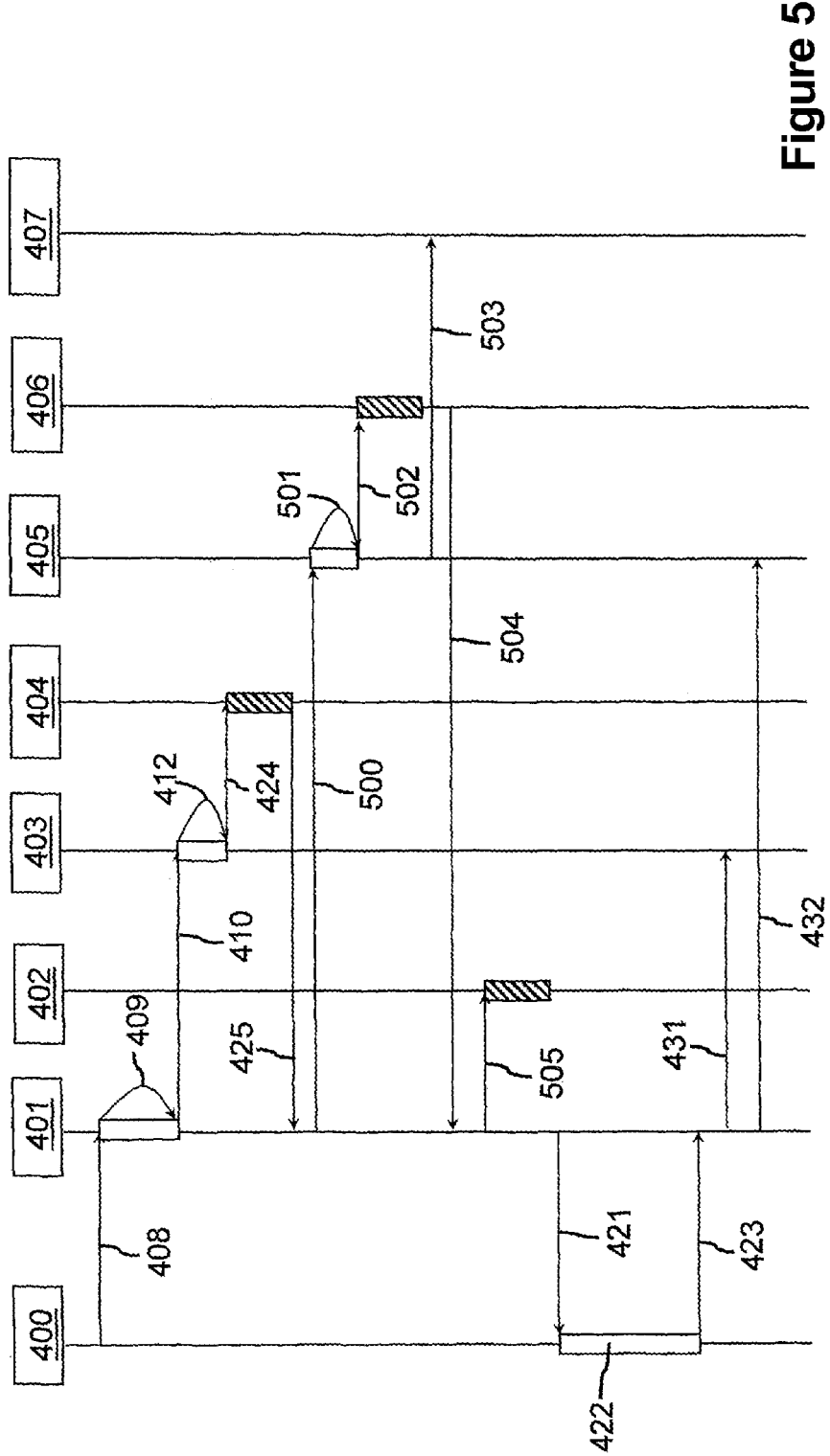
Figure 6:
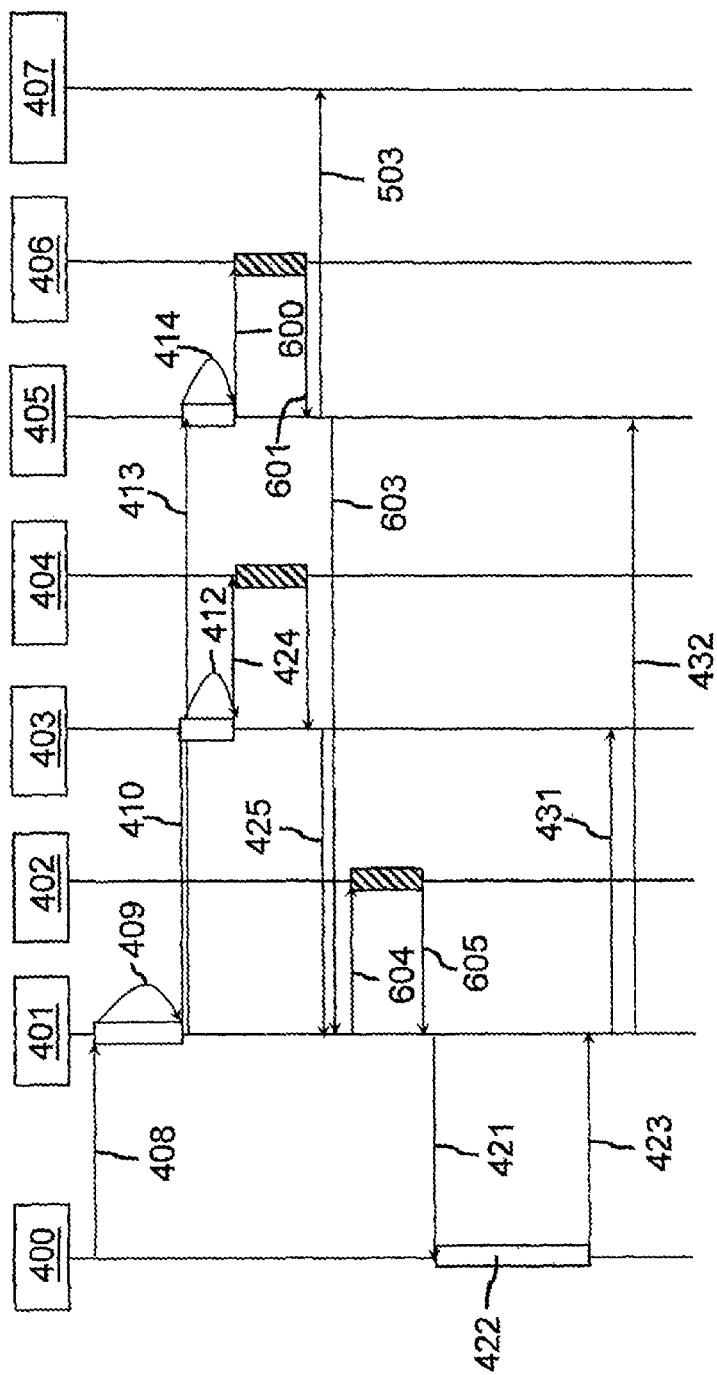

The protocol sequences illustrated in FIGS. 4 to 6 are each based on communication of the following elements:
400 requester (transmitter),
401 resource manager,
402 internal or external communication medium assigned to the resource manager 401,
403 further resource manager,
404 further internal or external communication medium assigned to the resource manager 403,
405 further resource manager,
406 further internal or external communication medium assigned to the resource manager 405,
407 desired resource assigned to the resource manager 405.

The resource managers 401, 403, 405 mentioned in the examples in FIGS. 4 to 6 may each be any desired resource managers 106, 207 of a computer system according to FIG. 1 or FIG. 2. The communication media 402, 404, 406 may each be any desired communication media 107, 108, 200, 201, 207 of a computer system according to FIG. 1 or FIG. 2. The desired resource 407 may be any desired resource 101, 102, 104, 105, 202, 203, 204 of a computer system according to FIG. 1 or FIG. 2.

In the sequence according to FIG. 4, the requester 400 first of all transmits a connection request 408 to the resource manager 401. There, the configuration is determined in step 409 (similar to step 301 in FIG. 3). The resource manager 401 determines that further resource managers must be involved in order to comply with the connection request. It therefore transmits requests 410, 413 to the resource managers 403, 405. The configuration is checked in step 412 in the resource manager 403. The configuration is checked in step 414 in the resource manager 405. If it is determined in each case that the connection request can be complied with according to the requests 410, 413 from the resource manager 401, this is communicated to the first-mentioned resource manager 401 by means of feedback 411, 415 from the resource managers 403, 405.

The resource manager 401 then transmits configuration requests 416, 417 to each of the resource managers 403, 405. In addition, the communication medium 402 is set according to the connection request by means of a request 418 from the resource manager 401. Furthermore, the communication medium 404 is set according to the connection request by means of a request 424 from the resource manager 403 and the communication medium 406 is set according to the connection request by means of a request 427 from the resource manager 405. The communication media 402, 404, 406 transmit respective confirmations (acknowledge) 419, 425, 428 to the respective resource manager 401, 403, 405 assigned to them.

It is also assumed that the desired resource 407 is managed by the resource manager 405. Accordingly, the resource manager 405 reconfigures the resource 407 by means of a request 429. The resource confirms the configuration with feedback (acknowledge) 430. The resource managers 405, 403 also confirm the execution of the desired settings to the resource manager 401 by means of confirmations 420, 426. If all confirmations have been received in the resource manager 401, the latter confirms this to the requester 400 by means of feedback (acknowledge) 421. The desired end-to-end communication connection according to the connection request 408 is therefore reserved. The requester 400 can now access the resource 407 by means of an access operation 422. If the access has been concluded, the requester 400 informs the resource manager 401 of this via a release notification 423. Accordingly, the resource 407 and the corresponding further elements involved can be released again, which is communicated by the resource manager 401 to the further resource managers 403, 405 involved by means of release notifications 431, 432.

In the example according to FIG. 4, it is assumed that the desired resource 407 or all desired resources is/are available and the resource managers 401, 403, 405 involved can comply with all requests. After the access operation 422 has been concluded, the resources can be restored, that is to say reconfigured, to their original state again.

The initial feasibility test which was carried out by means of the feasibility feedback 411, 415 in the sequence according to FIG. 4 is omitted in the example according to FIG. 5. This simplifies and accelerates the sequence. According to FIG. 5, a reservation request 410 is directly forwarded to the resource manager 403 after determining the configuration in step 409, which resource manager 403 then immediately reconfigures the communication medium 404. In a corresponding manner, the resource manager 401 directly passes a reservation request 500 to the resource manager 405 which immediately reconfigures the communication medium 406. The resource manager 405 also immediately blocks the resource 407 using a blocking request 503. The corresponding confirmations (acknowledge) are passed to the resource manager 401 by means of the feedback 425, 504.

If the confirmations 425, 504 have been received in the resource manager 401, the latter can directly reconfigure the communication medium 402 (step 505). The further sequence is then immediately carried out using the confirmation 421 to the requester 400 and the further steps 422, 423, 431, 432 which have already been explained in FIG. 4.

If it is not possible to comply with the desired connection request in the embodiment in FIG. 5, for example because the resources are being used, the resource managers 401, 403, 405 release all resources which are already being used again and reverse reconfigurations.

The protocol sequence according to FIG. 6 largely corresponds to the variant according to FIG. 5, but, in contrast to FIG. 5, the initiating resource manager 401 outputs the requests 410, 413 to the other resource managers 403, 405 involved in a parallel manner, with the result that they can already carry out the necessary steps for providing the resource 407 in a parallel manner. This further accelerates the protocol sequence.

The invention claimed is:

1. A method for coordinating access to a resource of a distributed computer system which has a plurality of distributed subscriber stations,
   wherein there are at least two subscriber stations of said plurality of distributed subscriber stations which each have
       at least one computer,
       at least one resource of the distributed computer system,
       at least one resource manager configured to manage resources of the distributed computer system which are assigned to said at least one resource manager, and
       at least one internal communication medium via which the at least one computer,
   wherein the at least one resource and the at least one resource manager are coupled inside a subscriber station of the at least two subscriber stations for the purpose of communicating data,
   wherein the at least two subscriber stations are coupled to one another for the purpose of communicating the data via at least one external communication medium,
   wherein additional resources and/or resource managers of the distributed computer system can be coupled to the external communication medium, comprising:
   a) a requester wishing to access a desired resource, which may be a resource beyond one or more of the at least two subscriber stations of the requester, transmits a connection request having parameters for establishing an end-to-end communication connection between the requester and the desired resource to the at least one resource manager assigned to said requester or to another resource manager of the distributed computer system,
   b) the at least one resource manager which receives the connection request transmits, at least when the connection request relates, as the desired resource, to an external resource which is not managed by the at least one resource manager which receives the connection request, requests to establish the desired end-to-end communication connection to at least one other resource manager of the distributed computer system,
   c) if the desired end-to-end communication connection to the external resource can be established, the desired resource is reserved by the at least one resource manager managing the desired resource according to the parameters of the connection request and the a least one resource manager managing the desired resource signals to the requester that the desired end-to-end communication connection can be established,
   d) on the request of the requester, the at least one resource manager managing the desired resource according to the parameters of the connection request and the a least one resource manager managing the desired resource signals to the requester that the desired end-to-end communication connection can be established then cooperatively establish the desired end-to-end communication connection according to the reservation, and
   e) the requester accesses the desired resource via the end-to-end communication connection which has been established.

2. The method as claimed in claim 1 wherein the at least one resource manager receiving the connection request first checks whether the desired resource is managed by the at least one resource manager receiving the connection request and, if so the at least one resource manager receiving the request does not transmit any requests to establish the desired end-to-end communication connection to other resource managers.

3. The method as claimed in claim 1 wherein the requester is selected from the group consisting of a computer of the distributed computer system, an application, a monitor, a hypervisor, and a client.

4. The method as claimed in claim 1 wherein the parameters of the connection request comprise at least the type, scope and time behavior of the desired resource.

5. The method as claimed in claim 1 wherein if the desired end-to-end communication connection cannot be established, the distributed computer system checks alternative configurations of the subscriber stations and/or of external communication media and, if an alternative configuration is suitable for complying with the connection request, accordingly reconfigures the respective subscriber station and/or the respective external communication medium.

6. The method as claimed in claim 1 wherein the requester is part of a different subscriber station of the distributed computer system than the desired resource.

7. The method as claimed in claim 1 wherein the at least one resource manager managing the desired resource sets the time behavior of the desired resource and/or further resources and/or communication media needed to access the desired resource according to the parameters of the connection request.

8. The method as claimed in claim 1 wherein the at least one resource manager managing the desired resource according to the parameters of the connection request and the a least one resource manager managing the desired resource signals to the requester that the desired end-to-end communication connection can be established ensure and/or control compliance with the parameters of the connection request by cooperatively synchronizing access operations.

9. The method as claimed in claim 1 wherein the at least one resource manager receiving the connection request or another resource manager which receives a request from a different resource manager respectively assesses the connection request or request with regard to its validity, feasibility, performance, security and/or influence on other components of the distributed computer system and, in the event of a negative assessment,
 a) refuses the connection request or request, or
 b) modifies the parameters of the connection request or request and assesses them again.

10. A computer system which has a plurality of distributed subscriber stations and which is configured to carry out a method as claimed in claim 1, comprising:
 at least two subscriber stations each having
  at least one computer,
  at least one resource,
  at least one resource manager configured to manage resources assigned to said resource manager, and
  at least one internal communication medium via which the at least one computer,
 wherein the at least one resource and the at least one resource manager are coupled inside a subscriber station of the at least two subscriber stations for the purpose of communicating data,
 wherein the at least two subscriber stations are coupled to one another for the purpose of communicating the data via at least one external communication medium,
 wherein resources and/or resource managers of the computer system are coupleable to an external communication medium.

11. The computer system as claimed in claim 10 wherein the communication medium comprises a multiplicity of network routers via which communication takes place in a packet-based manner between subscribers coupled thereto, and wherein different communication media can use different packet formats.

12. The computer system as claimed in claim 11 wherein the communication medium has at least one resource manager configured to manage resources of the computer system which are assigned to said at least one resource manager or is or are coupled to said at least one resource manager, and/or a plurality of communication media are allocated to the at least one resource manager for management.

13. The computer system as claimed in claim 10 wherein a respective at least one resource manager is implemented in software and/or hardware.

14. The computer system as claimed in claim 1 wherein at least two of the resource managers are different with respect to their complexity and/or functionality.

15. A computer program having instructions encoded on a non-transient computer medium configured to carry out a method as claimed in claim 1 when the computer program is executed on a computer or a plurality of computers of a computer system.

* * * * *